(12) United States Patent
Furuya (10) Patent No.: US 6,563,492 B1
(45) Date of Patent: May 13, 2003

(54) MULTI-FUNCTION SWITCH UNIT AND FUNCTION INDICATING METHOD OF THE SAME

(75) Inventor: Yoshiyuki Furuya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/499,626

(22) Filed: Feb. 8, 2000

(30) Foreign Application Priority Data

Mar. 3, 1999 (JP) .......................................... 11-055433

(51) Int. Cl.7 ................................................ G09G 5/00
(52) U.S. Cl. ........................ 345/178; 345/172; 345/175
(58) Field of Search ................................. 345/184, 104, 345/156, 173, 176, 684, 650, 764, 768, 172, 175, 178, 427; 701/36; 348/59

(56) References Cited

U.S. PATENT DOCUMENTS

| | | | | |
|---|---|---|---|---|
| 3,701,945 A | * | 10/1972 | Gallant et al. ............... 455/507 |
| 4,789,858 A | * | 12/1988 | Fergason et al. ............ 345/104 |
| H716 H | * | 12/1989 | McDonald et al. .......... 345/175 |
| 5,148,015 A | * | 9/1992 | Dolan ........................ 250/221 |
| 5,189,732 A | * | 2/1993 | Kondo ........................ 345/840 |
| 5,565,894 A | * | 10/1996 | Bates et al. ................. 345/178 |
| 5,572,239 A | * | 11/1996 | Jaeger ......................... 345/172 |
| 5,574,836 A | * | 11/1996 | Broemmelsiek ............ 345/427 |
| 5,657,434 A | * | 8/1997 | Yamamoto et al. .......... 345/684 |
| 5,673,127 A | * | 9/1997 | Takahara et al. ............ 349/140 |
| 5,757,359 A | * | 5/1998 | Morimoto et al. ........... 345/156 |
| 5,801,953 A | * | 9/1998 | Thoma et al. ............... 364/487 |
| 5,877,751 A | * | 3/1999 | Kanemitsu et al. .......... 345/173 |
| 5,916,288 A | * | 6/1999 | Hartman ....................... 701/36 |
| 6,067,074 A | * | 5/2000 | Lueders ...................... 345/156 |
| 6,084,594 A | * | 7/2000 | Goto .......................... 345/427 |
| 6,204,845 B1 | * | 3/2001 | Bates et al. ................. 345/764 |
| 6,377,295 B1 | * | 4/2002 | Woodgate et al. ............. 348/59 |

FOREIGN PATENT DOCUMENTS

JP            9-198176            7/1997

* cited by examiner

Primary Examiner—Steven Saras
Assistant Examiner—Fritz Alphonse
(74) Attorney, Agent, or Firm—Armstrong, Westerman & Hattori, LLP (57) ABSTRACT

A multi-function switch unit having at least one operation button, a screen located at the rear of the operation button to display an image of function of the operation button. The image on the screen is visible through the operation button. An input device sets the transfer direction and transfer distance of the position of the image on the screen. An indication position adjusting device moves the image position on the screen according to the transfer direction and distance input by the input device such that the image transferred is better visible through the operation button. The multi-function switch unit may have a plurality of the operation buttons and can display a plurality of marks each indicating one of different directions such that the marks each are visible through different one of the operation buttons.

7 Claims, 11 Drawing Sheets

MULTI-FUNCTION SWITCH UNIT AND FUNCTION INDICATING METHOD OF THE SAME

BACKGROUND OF THE INVENTION

1. Field of the Invention

The present invention generally relates to a multi-function switch unit allowing a selective operation for plural kinds of the associated devices.

2. Related Art

Electrical equipment integrally installed in a central console of an automobile vehicle like a car stereo and a car air-conditioning unit each require an operation switch which is usually provided for each equipment.

However, each electrical equipment tends to have multi-functions as technology progresses, requiring an increased number of operation buttons. Thus, it has been difficult to arrange all the increased number of operation buttons on the central console, and the many buttons tend to degrade the console in appearance.

To solve this problem, there has been proposed, for example, electrical equipment disclosed in Japanese Patent Application laid-open No. H. 9-198176. The electrical equipment has a display arranged at the rear of an operation button. The display indicates the switch functions which are changeable, and the indicated functions are visible through a transparent part or by way of a through hole of the button.

In general, an operation button has a front surface on which the function of the button is indicated by hot-stamping or inscription. The button must have an enough size to keep visibility for safety when the button is used in a car cabin. It is also desired that the indication on the display is large enough to keep visibility when the function of the button is shown on the display.

Car cabin equipment, particularly electrical equipment of audio and air-conditioning, tend to be arranged in a central console of the car. Meanwhile, a driver seat or an assistant seat adjacent to the driver seat is usually shifted from the center of the console. Thus, the crews look diagonally operation buttons arranged on the console. This may cause a disadvantage that a part near a periphery of the displayed image is covered by an edge of the operation buttons or by a panel frame surrounding the operation buttons, because there is a space between the operation buttons and a liquid-crystal display screen and because the operation button itself has a thickness in addition to the position of the operation buttons related to the crew seats, when the functions of the operation buttons are indicated on the display screen disposed at the rear of the operation buttons.

Hence, in order that the function indication on the display is completely visible even from the diagonal points, the function indication must be smaller because there are the operation buttons in front of the display although the display allows a larger indication of the button function.

SUMMARY OF THE INVENTION

In view of the aforementioned disadvantage, an object of the invention is to provide a multi-function switch unit and a function indicating method of the multi-function switch unit, which enable the most effective use of a display in image size when the display screen is located at the rear of operation buttons of the multi-function switch unit such that images on the screen indicating functions of the operation buttons are better visible through the operation buttons.

For achieving the object, a first aspect and a second additional aspect of the invention, which are related to such a function indicating method of a multi-function switch unit, will be described hereinafter. Furthermore, third to sixth aspects of the invention, which are related to such a multi-function switch unit, will be described.

A first aspect of the invention is a function indicating method of a multi-function switch unit comprising: providing a screen located at the rear of at least one operation button of the multi-function switch unit to display an image of function of the operation button, the image on the screen being visible through the operation button, and adjusting the position of the image on the screen for a diagonal view through the operation button. In the function indicating method, the adjustment of the position of the image on the screen for a diagonal view through the operation button allows a complete view of the image which otherwise would be partly invisible because an edge of the operation buttons or a panel frame surrounding the operation buttons covers a part of the image. Thus, the image can have a larger size to be clearly visible through the button.

A second aspect of the invention is the function indicating method as set forth in the first aspect of the invention. The operation button can move and adjust the position of the image on the screen in at least one direction. Accordingly, the operation button itself can move and adjust the position of the image which is visible on the screen through the button, requiring no additional operation button for moving the image position in the associated direction. This provides a simplified means for adjusting the indication position of the image in response to any different view direction.

Figure 1:
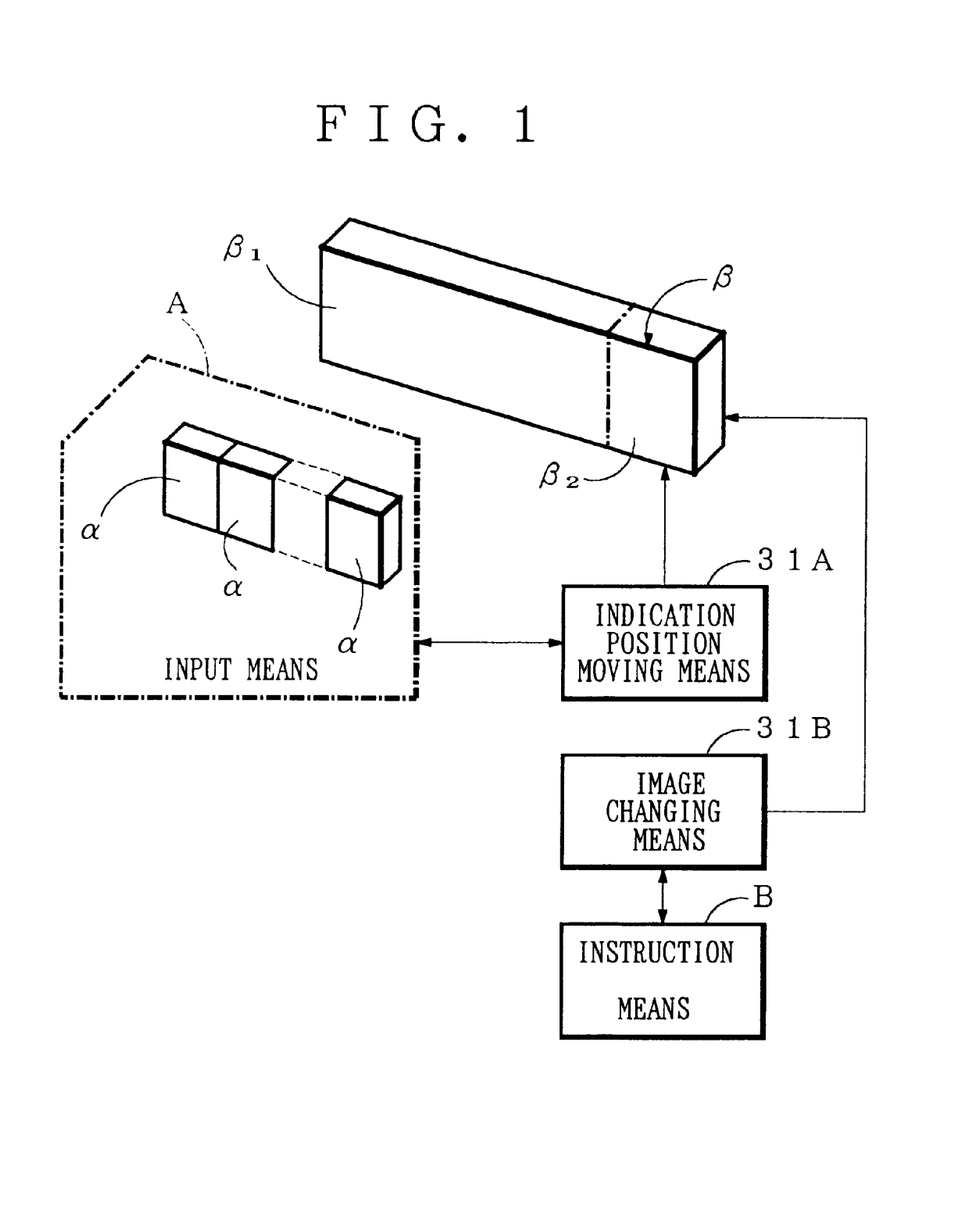
FIG. 1 is an illustration showing a basic configuration of a multi-function switch unit according to the present invention.

A third aspect of the invention is a multi-function switch unit as illustrated in FIG. 1. The multi-function switch unit comprises at least one operation button α, a screen β located at the rear of the operation button α to display an image of function of the operation button α wherein the image on the screen β is visible through the operation button α, an input means A for setting the transfer direction and transfer distance of the position of the image on the screen β, and an indication position moving means 31A for moving the position of the image on the screen β according to the transfer direction and transfer distance input by the input means A such that the image transferred by the indication position moving means 31A is visible through the operation button α. Accordingly, the input means A sets the transfer direction and transfer distance of the position of the image on the screen β, and the indication position moving means 31A moves the position of the image on the screen β according to the transfer direction and transfer distance input by the input means A such that the image transferred by the indication position moving means 31A is visible through the operation button α. That is, the image movement allows a hidden part of the image to be visible through the bottom, providing a clear view of the image showing the button function.

A fourth aspect of the invention is the multi-function switch unit as set forth in the third aspect of the invention further comprising an instruction means B for instructing the adjustment of the position of the image on the screen β and an image changing means 31B for displaying a mark indicating the transfer direction of the image on the screen β in relation to the instruction of the instruction means B. The input means A includes the operation button β through which the mark is visible. Accordingly, the instruction means B instructs the adjustment of the position of the image on the screen β and the image changing means 31B displays a mark indicating the transfer direction of the image on the screen β in relation to the instruction of the instruction means B. The operation button α can be commonly used as the input means A. That is, the transfer direction of the image can be seen through the operation button, which enables an easy input operation for moving the image.

A fifth aspect of the invention is the multi-function switch unit as set forth in the fourth aspect of the invention, wherein the multi-function switch unit has a plurality of the operation buttons α and the image changing means 31B can change to display a plurality of marks each indicating one of different directions such that the marks each are visible through different one of the operation buttons. Accordingly, by the image changing means 31B, the plurality of marks each indicating one of different directions are displayed such that the marks each are visible through different one of the operation. The plural buttons allow an easy movement of the image in any of the different directions.

A sixth aspect of the invention is the multi-function switch unit as set forth in the third aspect of the invention, wherein the screen β has an indirect image display area β1 which is visible through the operation button and a direct image display area β2 which is not covered with the operation button, and the indication position moving means 31A can move the position of the image on the indirect image display area β1. In the direct image display area β2, no transfer of displayed images is carried out. Thus, the direct visible area of the display indicates the images which are not moved by the operation of the buttons to keep the images in the best position in the direct visible area.

DETAILED DESCRIPTION OF THE PREFERRED EMBODIMENT

Referring to the accompanied drawings, Hereinafter, a multi-function switch unit and a function indicating method of the multi-function switch unit according to the invention will be discussed in detail.

Figure 2:
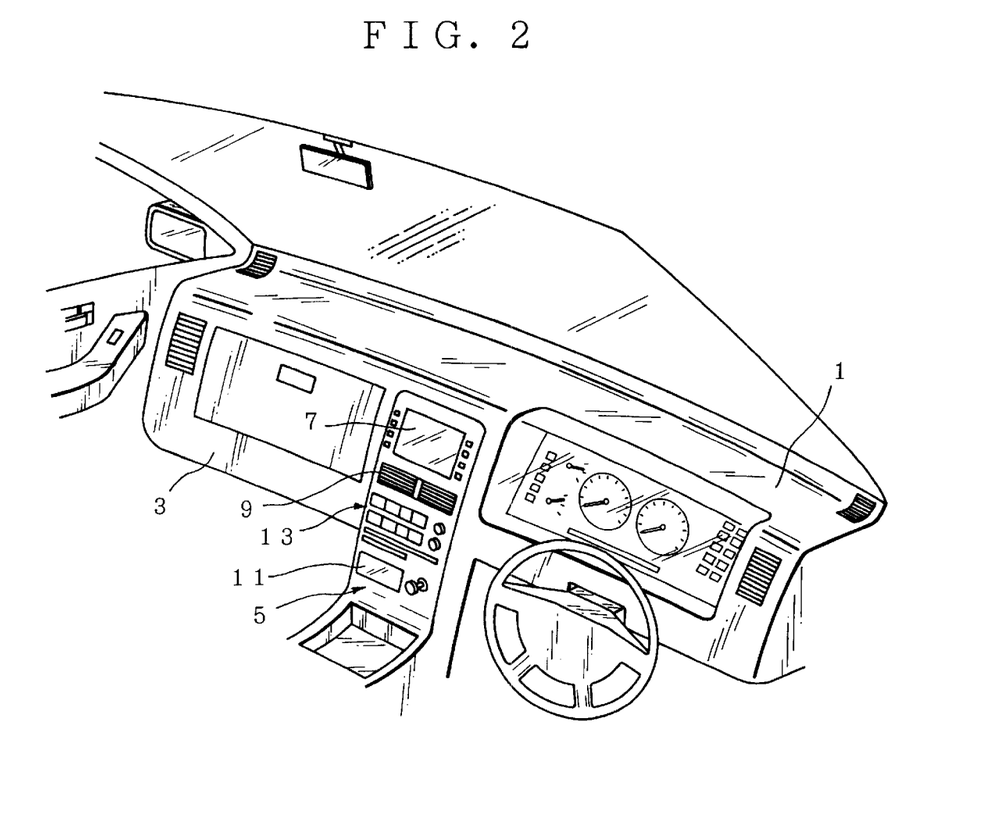
FIG. 2 is a general perspective view showing a dash board and its surroundings including a central console to which a multi-function switch unit according to the present invention is applied.

Before discussing embodiments of a multi-function switch unit (called as the switch unit hereinafter) according to the invention, an applied example of the switch unit will be discussed, which is illustrated in FIG. 2.

FIG. 2 is a perspective view generally showing a car dashboard and its surroundings including a central console to which a switch unit according to the invention is applicable. Denoted 1 is a dashboard and denoted 3 is an instrument panel. In a generally middle part of the instrument panel 3, there is disposed a central console 5 in a transverse direction of the car.

The central console 5 has a combination panel 13 including a switch unit of a first embodiment of the present invention. Above or below the combination panel 13, there are arranged a car navigation screen 7, an air-conditioning outlet 9, and an ashtray 11. The combination panel 13 may be replaced by a combination panel 13A including another switch unit of a second embodiment of the present invention.

Next, referring to FIGS. 3 to 11, the switch unit of the first embodiment will be discussed.

Figure 3:
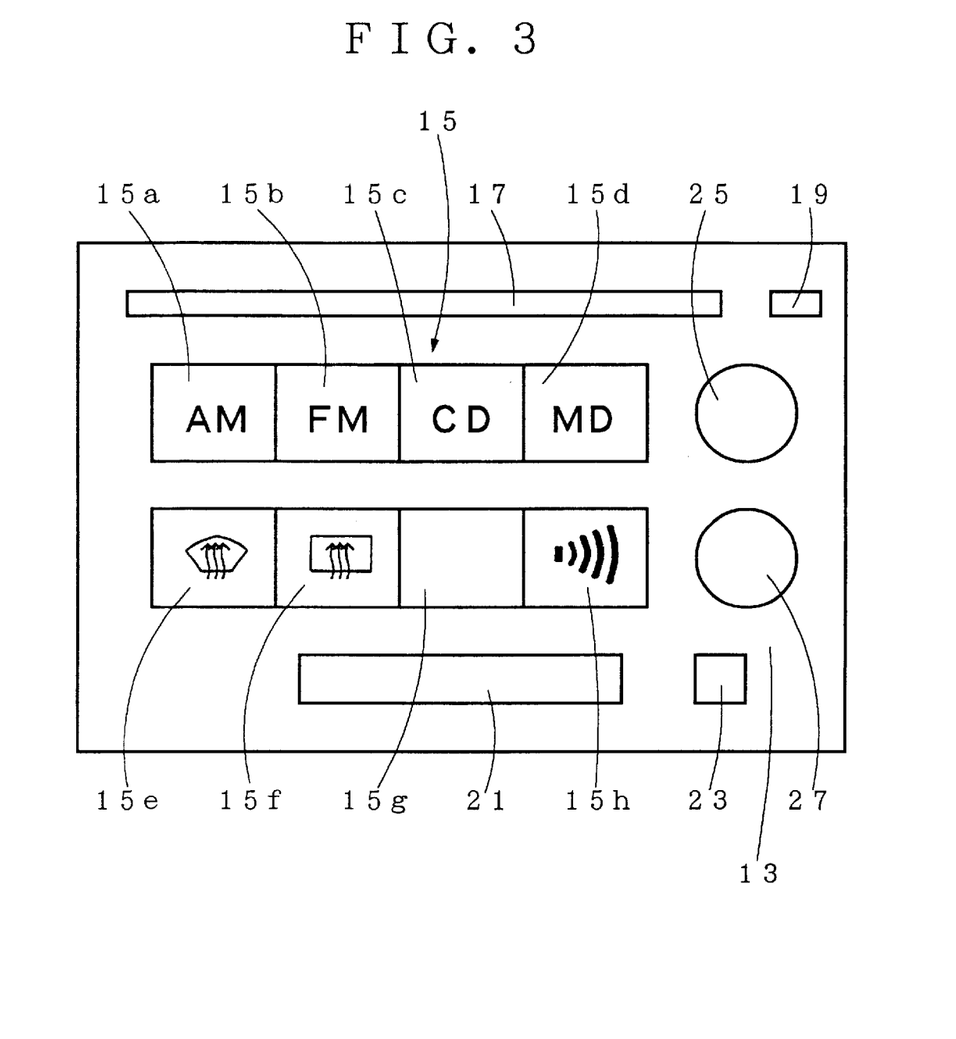
FIG. 3 is a front view showing generally a switch unit of a first embodiment according to the invention, which is in a default mode.

FIG. 3 is a primary front view showing the switch unit of the first embodiment. The combination panel 13 having the switch unit is provided with a multi-switch section 15, a CD slot 17 with its injection button 19, an MD slot 21 with its injection button 23, an audio vole adjusting dial 25, an air-conditioning temperature setting dial 27.

Figure 4:
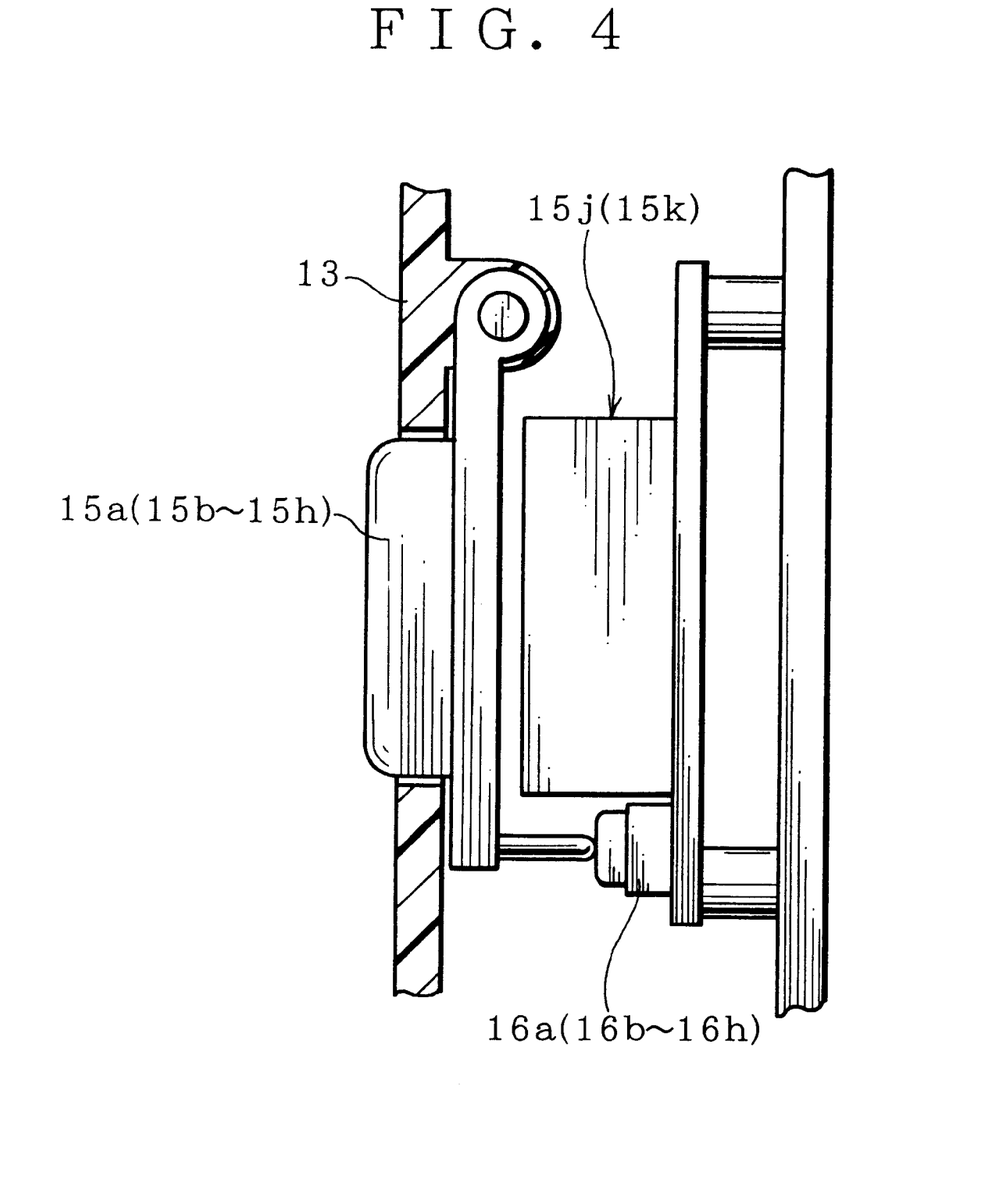
FIG. 4 is a partially sectional, side view showing generally the switch unit of FIG. 3.

As illustrated in FIG. 3, the multi-switch section 15 has two horizontal rows of operation buttons 15a to 15h, each row having four of the buttons as illustrate in FIG. 4. The operation buttons 15a to 15d composing the upper row are made of a transparent material so that an image on a liquid-crystal display 15j arranged at the rear of the operation buttons 15a to 15d is visible through the buttons. The image is usually illuminated from the inside of the display. Similarly, The operation buttons 15e to 15h composing the lower row are also made of a transparent material so that an image on a liquid-crystal display 15k arranged at the rear of the operation buttons 15e to 15h is visible through the buttons.

As illustrated in FIG. 4, at the rear of the multi-switch section 15, there are arranged limit switches 16a to 16h for detecting the pushing operation of the buttons 15a to 15h in no interference relationship with the illumination light of the displays 15j, 15k.

The liquid-crystal display 15j, which indicates default-mode marks as shown in FIG. 3, can also be changed to indicate other mode marks. The marks each are visible through one of the operation buttons 15a to 15h and are a character or a letter showing the function of the button.

The default-mode indicates the letters of "AM", "FM", "CD", and "MD" on the display 15j under the four upper operation buttons 15a to 15d for showing associated selectable devices. Meanwhile, under the three lower operation buttons 15e, 15f, and 15h, symbol marks are displayed on the display 15k each for showing a defogging device, a hot-wire type rear window heater, or traffic information.

Figure 5:
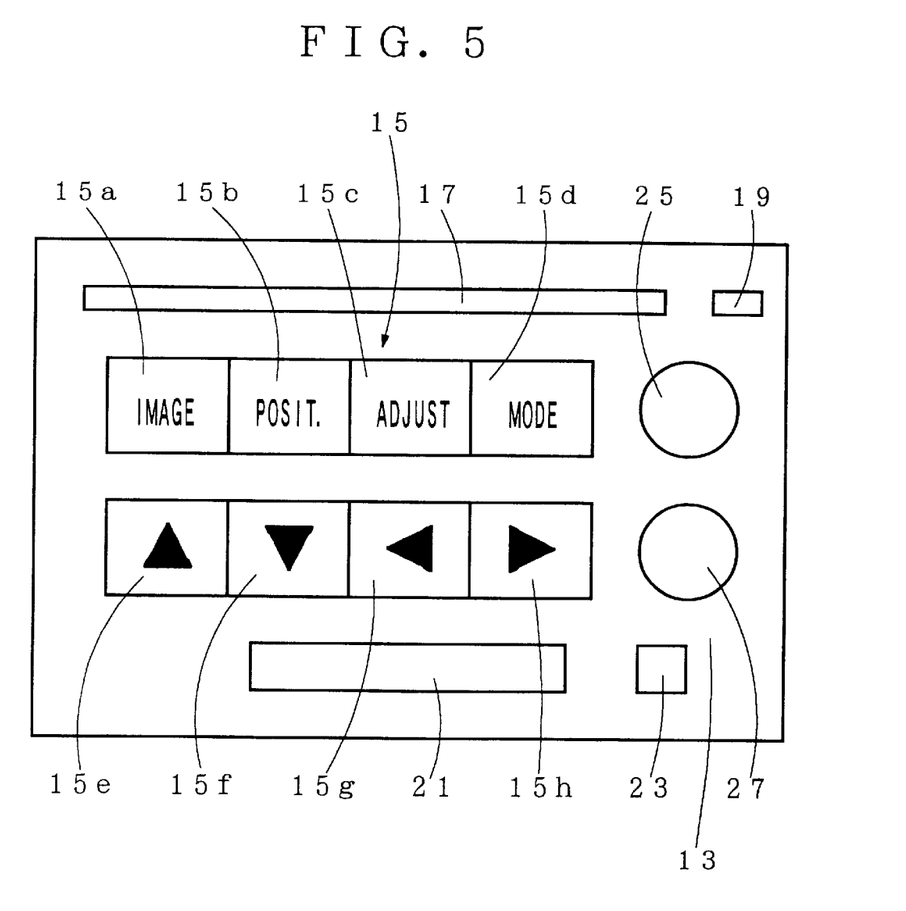
FIG. 5 is a front view showing generally the switch unit of FIG. 3, which is in a position adjusting mode.

In a position adjusting mode shown in FIG. 5, the letters of "IMAGE POSIT. ADJUST MODE" are indicated on the display 15j under and across the four upper operation buttons 15a to 15d. Meanwhile, under the four lower operation buttons 15e to 15h, arrow head characters each showing one of upward, downward, right, and left directions are indicated on the display 15k.

In addition, the change from the default mode to the position adjusting mode can be instructed by pushing operation the lower operation button 15g in the first embodiment. Alternatively, the change from the default mode to the position adjusting mode can be instructed by altering the setting of a related DIP (dual inline package) switch or by a special combined operation of some of the operation buttons 15a to 15h.

Next, the switch unit of the first embodiment will be discussed in detail in respect of electrical configuration thereof.

Figure 6:
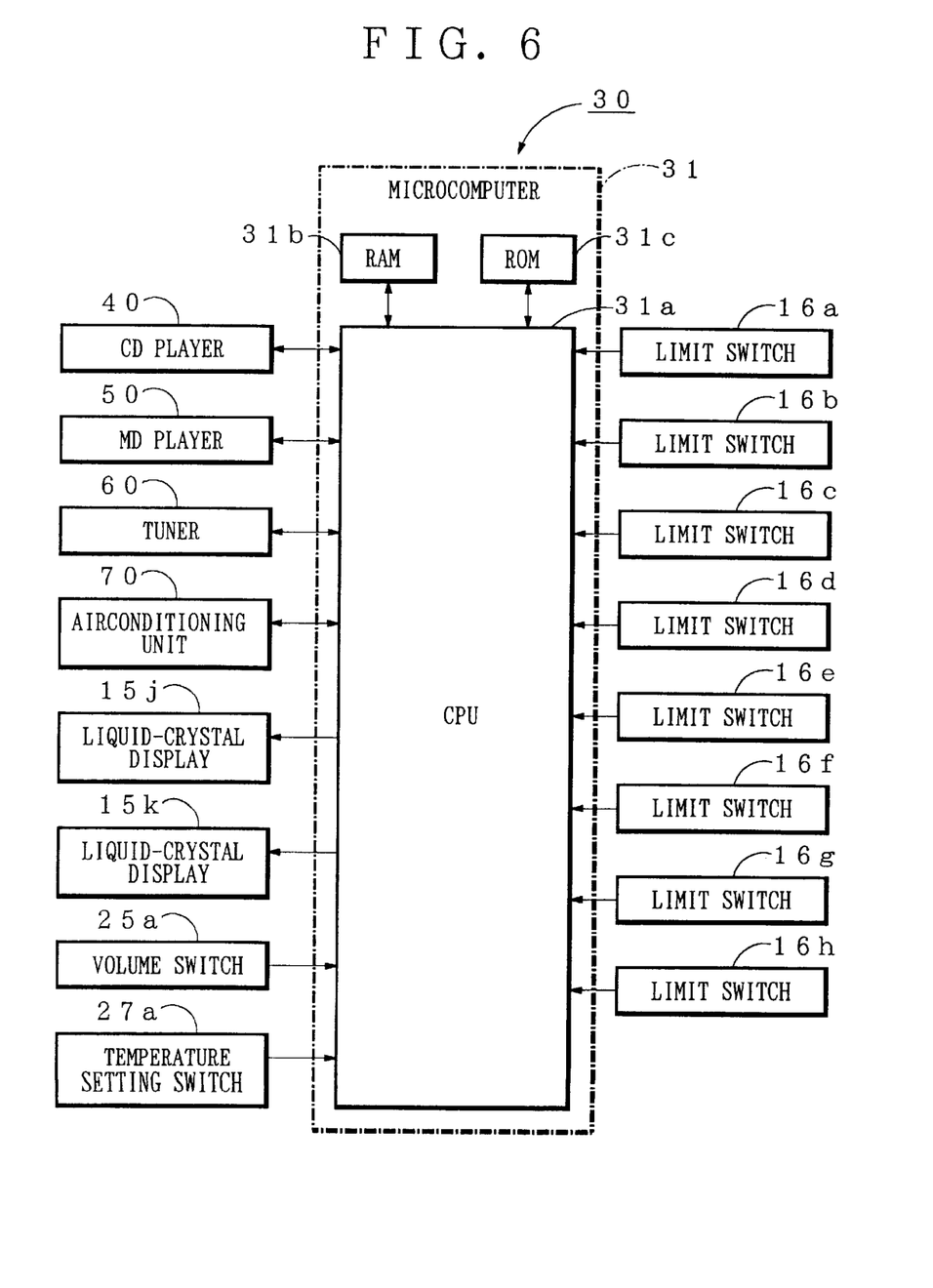
FIG. 6 is a block diagram showing generally an electrical configuration of the switch unit of FIG. 3.

As illustrated in a block diagram of FIG. 6, the switch unit of the first embodiment has a micro computer 31 controlling the indication of the aforementioned liquid-crystal displays 15j, 15k. The computer 31 comprises a CPU (central processing unit) 31a, a RAM (random access memory) 31b, and a ROM (read-only memory) 31c. The CPU 31a is electrically connected to a CD player 40, an MD player 50, a tuner 60, and an air conditioning unit 70 which are operated according to the pushing operation of the buttons 15a to 15h. The CPU 31a is also electrically connected to the limit switches 16a to 16h, the liquid-crystal displays 15j, 15k, a volume switch 25a for changing an electrical output according to the turning of the volume dial 25, a temperature setting switch 27a for changing an electrical output according to the turning of the temperature setting dial 27.

The RAM 31b has a data area and a work area used for executing various processes. The work area includes areas used for flags and buffers. The ROM 31c stores a control program for execution of various processes of the CPU 31a.

In the switch unit of the first embodiment, when the multi-switch section 15 is in the default mode state, the pushing operation of the button 15a indicating the abbreviation "AM" changes the indication on the displays 15j, 15k from the default mode state to an AM radio mode state (not shown).

Similarly, when the multi-switch section 15 is in the default mode state, the pushing operation of the button 15b indicating the abbreviation "FM" changes the indication on the displays 15j, 15k, from the default mode state to an FM radio mode state (not shown).

Furthermore, when the multi-switch section 15 is in the default mode state, the pushing operation of the button 15c indicating the abbreviation "CD" changes the indication on the displays 15j, 15k from the default mode state to a CD mode state (not shown).

Similarly, when the multi-switch section 15 is in the default mode state, the pushing operation of the button 15d indicating the abbreviation "MD" changes the indication on the displays 15j, 15k from the default mode state to an MD mode state (not shown).

In addition, a predetermined time-up period T1 may elapse with no operation of the buttons 15a to 15h, the volume dial 25, and the temperature setting dial 27 being carried out after the multi-switch section 15 has been changed from the default mode state to a state showing the AM radio mode, the FM radio mode, the CD mode, or the MD mode. This causes the multi-switch section 15 to automatically return to the default mode state.

When the multi-switch section 15 is in the default mode state, the pushing operation of each of three lower buttons 15e, 15f, and 15h each related to the symbol marks for showing the defogging device, the hot-wire type rear window heater, or the traffic information changes each button from an OFF state to an ON state or vice versa. The OFF state is indicated in a white color, and the ON state is indicated in an inverse color with a shade.

Next, referring to a flow chart shown in FIG. 7, processes executed by the CPU 31a according to a control program stored in the ROM 31c, particularly processes related to image position adjustment on the displays 15j, 15k, will be discussed.

By turning an accessory switch (not shown) on, the computer 31 receives an electric power from a battery (not shown) mounted on a car so that the program starts. First, the CPU 31a resets the RAM 31b, for example, so that each flag in the RAM 31b is set to zero (step S1).

After step S1, a default mode is indicated on the displays 15j, 15k (step S3). Then, based on output signals of the limit switches 16a to 16h, the volume switch 25a, and the temperature setting switch 27a, it is determined that one of the operation buttons 15a to 15h, the volume adjusting dial 25, or the temperature setting dial 27 has been operated (step S5).

When no operation of the buttons is determined in step S5 (N in step S5), step S5 is repeated until the determination becomes affirmative. When an operation of the buttons is determined in step S5 (Y in step S5), it is further determined whether the button 15g having no specific function has been pushed (step S7).

When the operation is not related to the button 15g (N in step S7), step S9 executes a process associated with one of the operation buttons 15a to 15f, 15h, the volume adjusting dial 25, or the temperature setting dial 27, based on output signals of the limit switches 16a to 16f, 16h, the volume switch 25a, and the temperature setting switch 27a. After step S9, the program returns to step S5.

On the other hand, when the button 15g has been operated (Y in step S7), step S11 indicates position adjusting mode images on the displays 15j, 15k. Then, a timer in a timer area of the RAM 31b starts (step S13), and a next step S15 determines whether one of the lower buttons 15e to 15h has been operated based on output signals of the limit switches 16e to 16h.

When one of the lower buttons 15e to 15h has been operated (Y in step S15), the program goes to step S21. When none of the lower buttons 15e to 15h have been operated (N in step S15), step S17 determines whether a timer value T1 in a timer area has reached a predetermined time-out value T1MAX.

When step S17 has determined that the timer value T1 has not reached the predetermined time-out value T1MAX (N in step S17), the program returns to step S15. On the other hand, the determination of step S17 is affirmative (Y in step S17), step S19 completes count of the timer and sets the timer value T1 to zero. Then, the program returns to step S3.

Step S21 determines whether the button 15e having an upward movement function has been operated. When the determination of step S21 is affirmative (Y in step S21), step S23 moves the position adjusting images on the displays 15j, 15k upward by a predetermined pitch, and then the program goes to step S35.

On the other hand, when the determination of step S21 is negative (N in step S21), step S25 determines whether the button 15f having a downward movement function has been operated. When the determination of step S25 is affirmative (Y in step S25), step S27 moves the position adjusting images on the displays 15j, 15k downward by a predetermined pitch, and then the program goes to step S35.

When the determination of step S25 is negative (N in step S25), step S29 determines whether the button 15g having a left movement function has been operated. When the determination of step S29 is affirmative (Y in step S29), step S31 moves the position adjusting images on the displays 15*j*, 15*k* to the left by a predetermined pitch, and then the program goes to step S35.

When the determination of step S29 is negative (N in step S29), step S33 moves the position adjusting images on the displays 15*j*, 15*k* to the right by a predetermined pitch, and then the program goes to step S35.

The step S35 sets the timer value T1 to zero. Then, the program returns to step S15.

Figure 7:
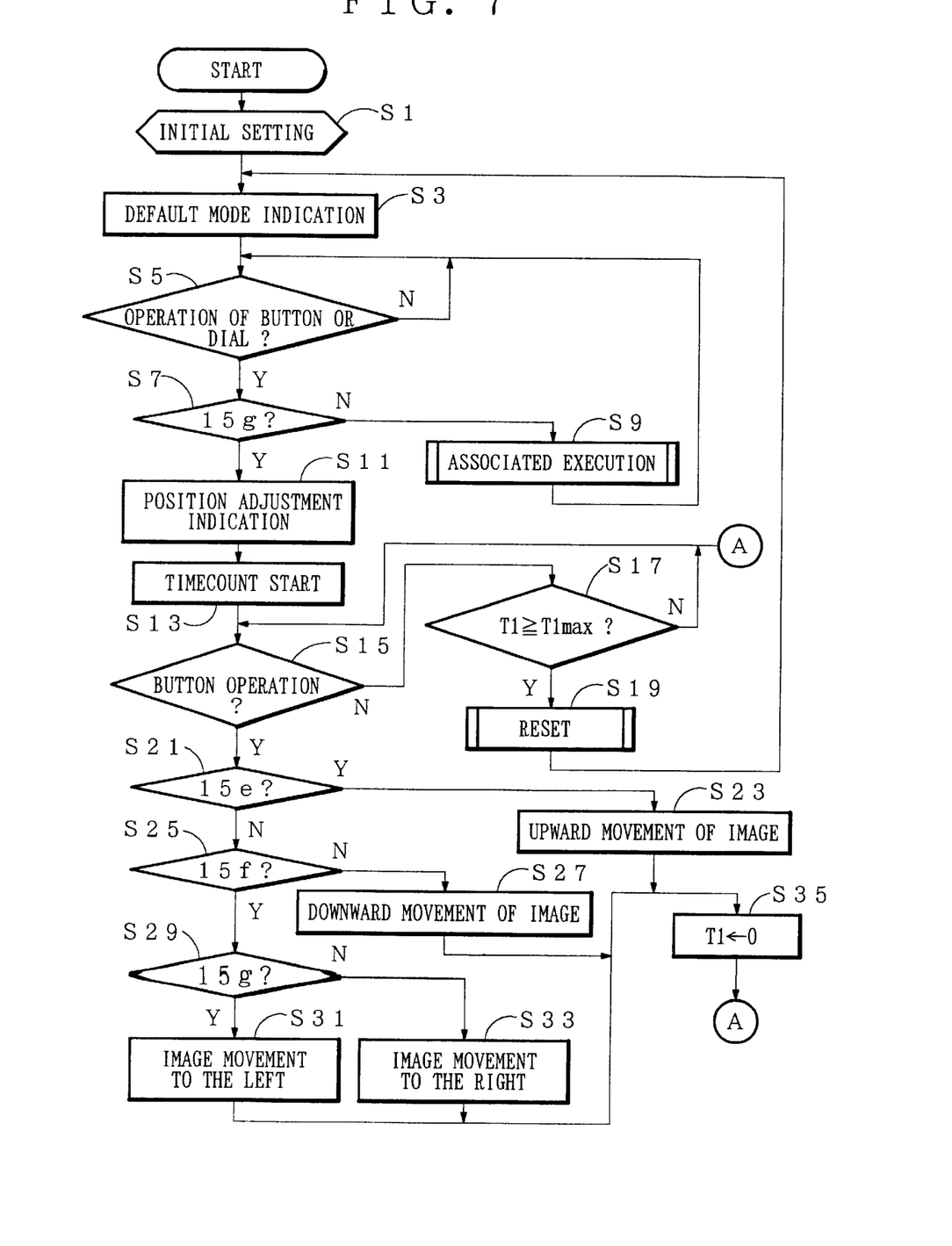
FIG. 7 is a flow chart showing processes executed by a CPU according to a control program stored in a ROM of a micro computer.
Figure 8:
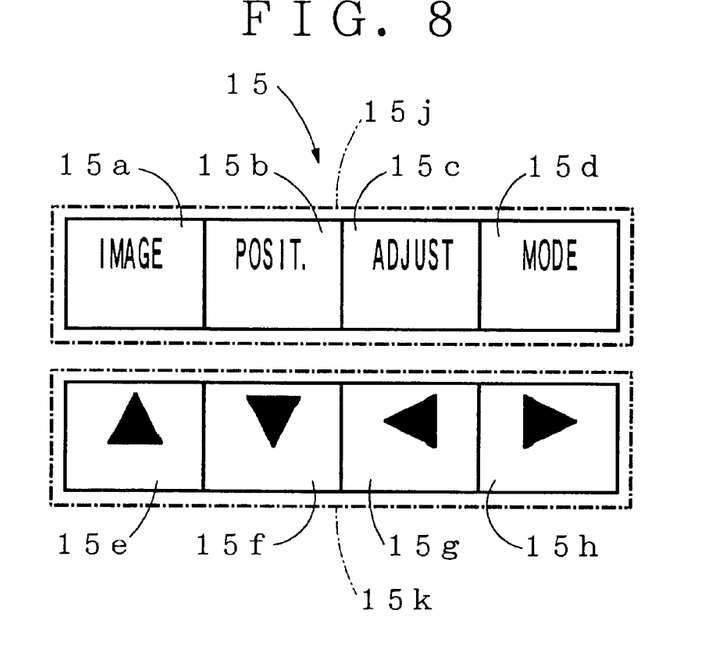
FIGS. 8 to 11 each show a view illustrating a multi-switch section of the switch unit of FIG. 3, which is indicating a position adjusting mode.
Figure 9:
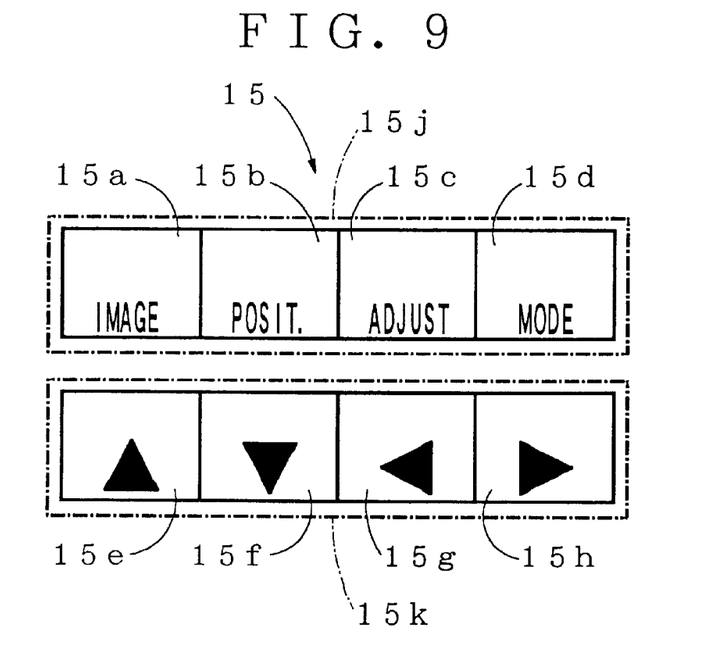
Figure 10:
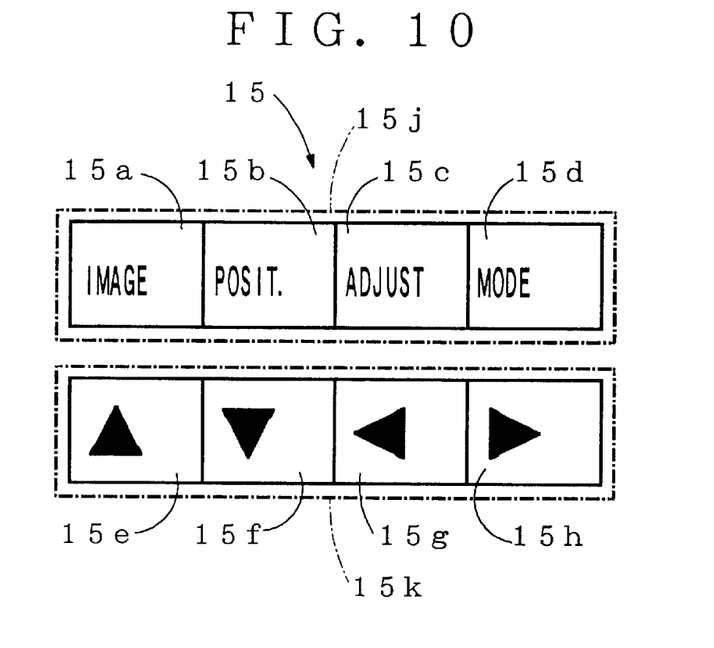
Figure 11:
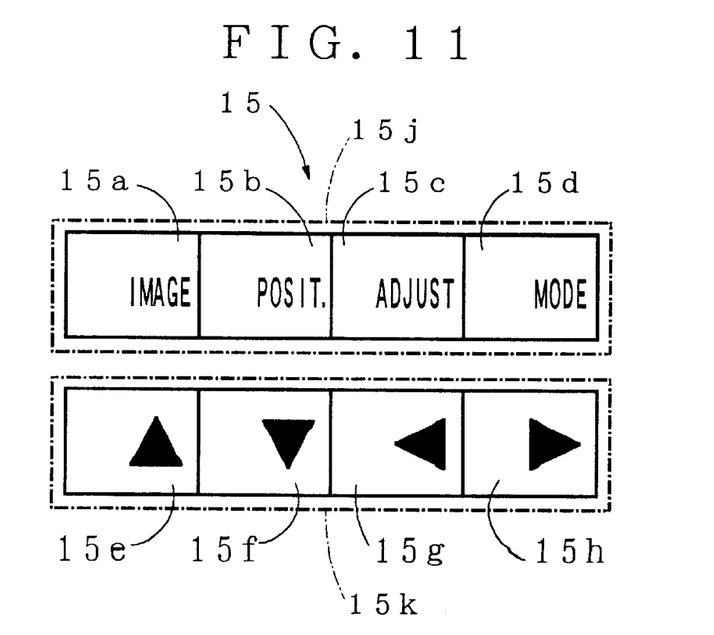

It is noted that the indication position moving means 31A described in the summary of the invention corresponds to the steps S23, S27, S31, and S33 in the flow chart of FIG. 7 of the first embodiment. Furthermore, the image changing means 31B described in the summary of the invention corresponds to the step S11. The input means A described in the summary of the invention corresponds to the operation buttons 15*e* to 15*h* which have been indicating a position adjusting mode in the multi-switch section 15. The adjustment instruction means B described in the summary of the invention corresponds to the operation button 15*g* which have been in a state other than the position adjusting mode in the multi-switch section 15.

Furthermore, the operation button α described in the summary of the invention corresponds to the operation buttons 15*e* to 15*h* of the first embodiment, and the screen β described in the summary of the invention corresponds to the displays 15*j*, 15*k* related to the operation buttons 15*a* to 15*h*.

Next, the operation of the switch unit 30 of the first embodiment having the aforementioned configuration will be discussed.

Turning the accessory switch of the car to ON indicates the default-mode on the liquid-crystal displays 15*j*, 15*k*. The multi-switch section 15, as illustrated in FIG. 3, indicates the letters of "AM", "FM", "CD", and "MD", and indicates also the symbol marks for showing a defogging device, a hot-wire type rear window heater, and traffic information through the operation buttons 15*a* to 15*f*, and 15*h*. Through the button 15*g*, none of characters and symbols are visible.

In the default-mode indication state of the multi-switch section 15, the pushing operation of the button 15*g* indicates the position adjusting mode image on the displays 15*j*, 15*k*. That is, in the multi-switch section 15, the letters of "IMAGE POSIT. ADJUST MODE" are indicated to be visible through and across the upper operation buttons 15*a* to 15*d*, and arrow head marks showing upward, downward, left, and right directions are indicated to be visible through the lower operation buttons 15*e* to 15*h* as illustrated in FIG. 5.

In the position adjusting mode indication state of the multi-switch section 15, the pushing operation of the button 15*e* through which an upward arrow head mark is visible moves upward the letters of "IMAGE POSIT. ADJUST MODE" and the arrow head marks on the displays 15*j*, 15*k* by the predetermined pitch. While the pushing operation of the button 15*e* is repeated, the letters of "IMAGE POSIT. ADJUST MODE" and the arrow head marks move further upward on the displays 15*j*, 15*k*, so that they can move from the reference position shown in FIG. 3 to a higher position shown in FIG. 8.

Similarly, in the position adjusting mode indication state of the multi-switch section 15, the pushing operation of the button 15*f* through which a downward arrow head mark is visible moves downward the letters of "IMAGE POSIT. ADJUST MODE" and the arrow head marks on the displays 15*j*, 15*k* by the predetermined pitch. While the pushing operation of the button 15*f* is repeated, the letters of "IMAGE POSIT. ADJUST MODE" and the arrow head marks move further downward on the displays 15*j*, 15*k*, so that they can move from the reference position shown in FIG. 3 to a lower position shown in FIG. 9.

Furthermore, in the position adjusting mode indication state of the multi-switch section 15, the pushing operation of the button 15*g* through which a left arrow head mark is visible moves the letters of "IMAGE POSIT. ADJUST MODE" and the arrow head marks to the left on the displays 15*j*, 15*k* by the predetermined pitch. While the pushing operation of the button 15*g* is repeated, the letters of "IMAGE POSIT. ADJUST MODE" and the arrow head marks move further to the left on the displays 15*j*, 15*k*, so that they can move from the reference position shown in FIG. 3 to a left position shown in FIG. 10.

Similarly, in the position adjusting mode indication state of the multi-switch section 15, the pushing operation of the button 15*h* through which a right arrow head mark is visible moves the letters of "IMAGE POSIT. ADJUST MODE" and the arrow head marks to the left on the displays 15*j*, 15*k* by the predetermined pitch. While the pushing operation of the button 15*h* is repeated, the letters of "IMAGE POSIT. ADJUST MODE" and the arrow head marks move further to the right on the displays 15*j*, 15*k*, so that they can move from the reference position shown in FIG. 3 to a right position shown in FIG. 11.

When none of the lower buttons 15*e* to 15*h* are operated within the time-out period T1 after the multi-switch section 15 has changed to the position adjusting mode indication state, the multi-switch section 15 returns in the default mode indication state.

As described above, in the switch unit 30 of the first embodiment, the pushing operation of the button 15*g* indicates the position adjusting mode on the displays 15*j*, 15*k* when the multi-switch section is in the default mode indication state. Then, the pushing operation of one of the buttons 15*e* to 15*h* showing the upward, downward, left, and right arrow head marks moves the images on the displays 15*j*, 15*k* in the associated direction by the predetermined pitch.

Thus, the symbolic images visible through the operation buttons 15*a* to 15*h* can be moved to be clearly seen from the driver or assistant seat where the seat is not aligned with the center of the console 5 having the combination panel 13 with the multi-switch section 15. That is, the symbolic images can be moved to prevent that a peripheral portion of each symbolic image is invisible because of the diagonal view of the driver or assistant through each of the operation buttons 15*a* to 15*h*.

Next, referring to FIGS. 12 to 14, a switch unit of a second embodiment according to the present invention will be discussed.

Figure 12:
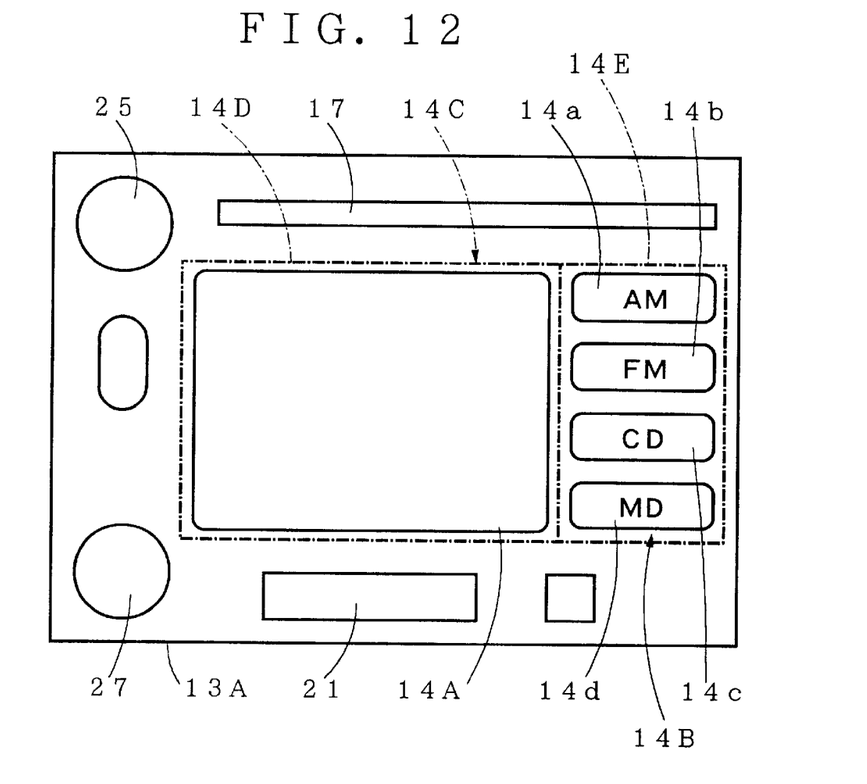
FIG. 12 is a front view showing generally a switch unit of a second embodiment according to the invention, which is in a default mode.

FIG. 12 is a primary front view showing the switch unit of the second embodiment. A combination panel 13A having the switch unit is provided with a multi-display section 14A, a multi-switch section 14B, a CD slot 17, an MD slot 21, an audio volume adjusting dial 25, an air-conditioning temperature setting dial 27, etc.

The multi-switch section 14B has a vertical row of operation buttons 14*a* to 14*d*. The operation buttons 14*a* to 14*d* illustrated by phantom lines are made of a transparent material. The display 14C is arranged across both the multi-display section 14A and the multi-switch section 14B.

The display 14C has a direct visible area 14D positioned at the rear of the multi-display section 14A and has an indirectly visible area 14E positioned at the rear of the multi-switch section 14B. Images indicated in the indirectly visible area 14E of the display 14C are visible through the transparent buttons 15a to 15d when illuminated from the inside of the display 14C.

As illustrated by phantom lines in FIG. 12, at the rear of the multi-switch section 14B, there are arranged limit switches (not shown) for detecting the pushing operation of the buttons 14a to 14d in no interference relationship with the illumination light of the display 14C.

In a default-mode, the multi-switch section 14B indicates the letters of "AM", "FM", "CD", and "MD" displayed under the operation buttons 15a to 15d for showing associated selectable devices. In the default-mode, the multi-display section 14A indicates explanations or the like about the selectable devices.

Figure 13:
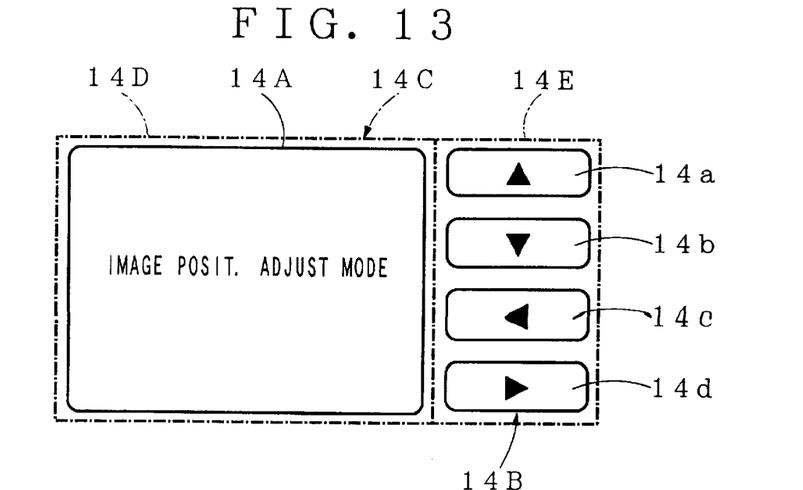
FIG. 13 is a block diagram showing generally an electrical configuration of the switch unit of FIG. 12.

FIG. 13 shows the multi-switch section 14B which is in a position adjusting mode. Under the four operation buttons 15a to 15d, the display 14C indicates arrow head marks showing upward, downward, left, and right directions in the indirectly visible area 14E. Furthermore, the direct visible area 14D of the display 14C indicates the letters of "IMAGE POSIT. ADJUST MODE" in the multi-display section 14A.

The display 14C can also indicate images of modes other than the default and position adjusting modes in the direct visible area 14D and the indirectly visible area 14E, a further description of which will be omitted.

In the second embodiment, the change from the default mode to the position adjusting mode of the multi-switch section 14B is carried out by altering the setting of a related DIP (dual inline package) switch (not shown).

Next, the switch unit of the second embodiment will be discussed in detail in respect of electrical configuration thereof.

The switch unit of the second embodiment has a configuration similar to the switch unit 30 of the first embodiment except the followings. In place of the displays 15j, 15k shown in FIG. 6, there is arranged the display 14C connected to a CPU 31a of a micro computer 31. Limit switches (not shown) for detecting the pushing operation of the buttons 14a to 14d are arranged in place of the limit switches 16a to 16h of the first embodiment.

Next, referring to a flow chart shown in FIG. 14, processes executed by the CPU 31a according to a control program stored in a ROM 31c particularly related to image position adjustment on the display 14C will be discussed.

By turning an accessory switch (not shown) to on, the computer 31 receives an electric power from a battery (not shown) mounted on a car so that the program starts. First, the CPU 31a resets the RAM 31b, for example, so that each flag in the RAM 31b is set to zero (step SA1).

After step SA1, a default mode is indicated on the display 14C (step SA3). Then, step SA5 determines whether the DIP switch is set to instruct the transfer to the position adjusting mode.

When the instruction for the transfer to the position adjusting mode is not set (N in step SA5), step SA5 is repeated until the determination becomes affirmative. When the determination is YES in step SA5, step SA11 indicates position adjusting mode images on the display 14C. Then, step SA15 determines whether one of the buttons 14a to 14d is operated based on output signals of the limit switches (not shown).

When one of the buttons 14a to 14d has been operated (Y in step SA15), the program goes to step SA21. When none of the buttons 14a to 14d have been operated (N in step S15), step SA17 determines whether the DIP switch is set to instruct the transfer to the position adjusting mode.

When the DIP switch has been set to instruct the transfer to the position adjusting mode (Y in step SA17), the program returns to step SA15. On the other hand, the determination of step SA17 is negative (N in step SA17), the program returns to step SA3.

When step SA15 has determined that one of the buttons 14a to 14d has been operated, step SA21 determines whether the button 14a having an upward movement function has been operated. When the determination of step S21A is affirmative (Y in step S21A), step SA23 moves upward the characters showing upward, downward, left, and right directions indicated in the indirectly visible area 14E of the display 14C by a predetermined pitch. Then, the program returns to step SA15.

When the determination of step SA21 is negative (N in step SA21), step SA25 determines whether the button 14b having a downward movement function has been operated. When the determination of step SA25 is affirmative (Y in step SA25), step SA27 moves downward the characters showing upward, downward, left, and right directions indicated in the indirectly visible area 14E of the display 14C by a predetermined pitch. Then, the program returns to step SA15.

When the determination of step SA25 is negative (N in step SA25), step SA29 determines whether the button 14c having a left movement function has been operated. When the determination of step SA29 is affirmative (Y in step SA29), step SA31 moves the characters showing upward, downward, left, and right directions indicated in the indirectly visible area 14E of the display 14C to the left by a predetermined pitch. Then, the program returns to step SA15.

When the determination of step SA29 is negative (N in step SA29), step SA33 moves the characters showing upward, downward, left, and right directions indicated in the area 14E of the display 14C to the left by a predetermined pitch. Then, the program returns to step SA15.

Figure 14:
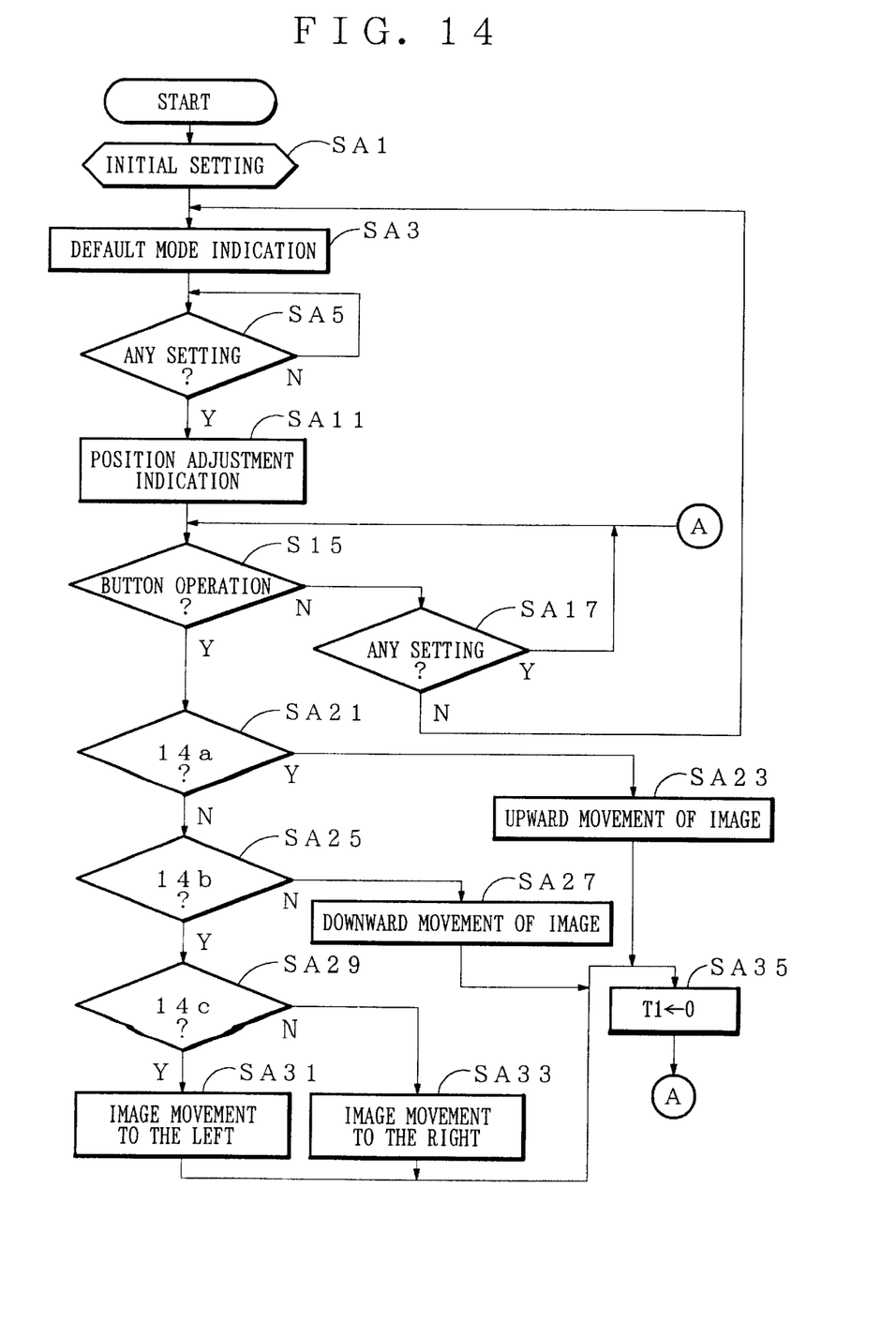
FIG. 14 is a flow chart showing processes executed by a CPU according to a control program stored in a ROM of a micro computer.

After the step SA23, SA27, SA31, or SA33 of the flow chart of FIG. 14 has moved the characters, a timer value T1 is set to zero in step SA35, before the program returns to step SA15.

It is noted that the indication position moving means 31A described in the summary of the invention corresponds to the steps SA23, SA27, SA31, and SA33 of the flow chart of FIG. 14 in the second embodiment. Furthermore, the image changing means 31B described in the summary of the invention corresponds to the step SA11. The input means A described in the summary of the invention corresponds to the operation buttons 14a to 14d which have been indicating a position adjusting mode in the multi-switch section 14B. The instruction means B described in the summary of the invention corresponds to the DIP switch (not shown).

Furthermore, the operation button a described in the summary of the invention corresponds to the operation buttons 14a to 14d of the second embodiment, and the screen β described in the summary of the invention corresponds to the direct visible area 14D and the indirectly visible area 14E.

Next, the operation of the switch unit of the second embodiment having the aforementioned configuration will be discussed.

Turning the accessory switch of the car to an ON state indicates the default mode on the liquid-crystal display 14C. The multi-switch section 14B, as illustrated in FIG. 12, indicates the letters of "AM", "FM", "CD", and "MD" visible through the buttons 14a to 14d.

In the default-mode indication state of the multi-switch section 14B, the position adjusting mode image is indicated on the display 14C according to the instruction of the DIP switch. That is, in the multi-switch section 14B, the characters showing upward, downward, left, and right directions are indicated to be visible through the buttons 14a to 14d, and the letters of "IMAGE POSIT. ADJUST MODE" are indicated in the multi-display section 14A.

In the position adjusting mode indication state of the multi-switch section 14B, the pushing operation of the button 14a through which the upward arrow head mark is visible moves upward the arrow head marks visible through the buttons 14a to 14d in the indirectly visible area 14E of the display 14C by the predetermined pitch. While the pushing operation of the button 14a is repeated, the arrow head marks move farther upward in the indirectly visible area 14E by the predetermined pitch each, so that they move from the reference position shown in FIG. 12 to a higher position.

Similarly, in the position adjusting mode indication state of the multi-switch section 14B, the pushing operation of the button 14b through which a downward arrow head mark is visible moves downward the arrow head marks visible through the buttons 14a to 14d in the indirectly visible area 14E of the display 14C by the predetermined pitch. While the pushing operation of the button 14b is repeated, the arrow head marks move further downward in the indirectly visible area 14E by the predetermined pitch each, so that they move from the reference position shown in FIG. 12 to a lower position.

Furthermore, in the position adjusting mode indication state of the multi-switch section 14B, the pushing operation of the button 14c through which a left arrow head mark is visible moves the arrow head marks visible through the buttons 14a to 14d in the indirectly visible area 14E of the display 14C to the left by the predetermined pitch. While the pushing operation of the button 14c is repeated, the arrow head marks move further to the left in the indirectly visible area 14E by the predetermined pitch each, so that they move from the reference position shown in FIG. 12 to the left.

Similarly, in the position adjusting mode indication state of the multi-switch section 14B, the pushing operation of the button 14d through which a right arrow head mark is visible moves the arrow head marks visible through the buttons 14a to 14d in the indirectly visible area 14E of the display 14C to the right by the predetermined pitch. While the pushing operation of the button 14d is repeated, the arrow head marks move further to the right in the indirectly visible area 14E by the predetermined pitch each, so that they move from the reference position shown in FIG. 12 to the right.

When the DIP switch ceases to instruct the position adjusting mode, the multi-switch section 14B automatically returns in the default mode indication state.

The switch unit of the second embodiment having the aforementioned configuration provides advantageous effects similar to the switch unit 30 of the first embodiment.

As described above, in the switch unit of the second embodiment, the pushing operation of the buttons 14a to 14d showing the upward, downward, left, and right arrow head marks moves the arrow-head marks in the associated direction within the indirectly visible area 14E of the display 14C.

Meanwhile, in the position adjusting mode, the direct visible area 14D of the display 14C indicates the letters of "IMAGE POSIT. ADJUST MODE", which is not moved by the operation of the buttons 14a to 14d to keep the letters in the best position in the direct visible area 14D.

In the first and second embodiments, the switch units used for selecting and setting of the operations of instruments mounted in a console of a car have been discussed. However, the present invention can be applied not only to such switch units used in a car, but also is widely applied to switch units for selecting and setting the operations of a plurality of instruments for an indoor setup by integrated operation buttons.

What is claimed is:

1. A function indicating method of a multi-function switch unit, comprising a plurality of steps of:

providing a screen located behind a plurality of operation buttons made of a transparent material of said multi-function switch unit to display an image indicative of a function to one of said plurality of operation buttons, the image on said screen being visible through said plurality of operation buttons, and adjusting a position of the image on said screen for a diagonal view by an operator through said plurality of operation buttons.

2. The function indicating method as set forth in claim 1, wherein said plurality of operation buttons can move and adjust the position of the image on said screen in at least one direction.

3. A multi-function switch unit, comprising:

a plurality of operation buttons made of a transparent material, a screen located behind said plurality of operation buttons to display an image indicative of a function to one of said plurality of operation buttons, the image on the said screen being visible through said plurality of operation buttons, an input device for setting a transfer direction and a transfer distance of the position of the image on said screen, and an indication position moving means for moving a position of the image on said screen according to the transfer direction and transfer distance input via said input device such that the image transferred by said indication position moving means is better visible through said plurality of operation buttons to an operator.

4. The multi-function switch unit as set forth in claim 3 further comprising:

an instruction means for instructing and an image changing means for changing the image to display a mark at least indicating the transfer direction of the image on the screen according to an instruction of said instruction means, wherein said input device includes said plurality of operation buttons through which the mark is visible.

5. The multi-function switch unit as set forth in claim 4, wherein said image changing means can change the image to display a plurality of marks each indicating one of many different directions such that the marks are each visible through each corresponding one of said plurality of operation buttons to the operator.

6. The multi-function switch unit as set forth in claim 3, wherein said screen has an indirect image display area which is visible through said plurality of operation buttons and a direct image display area which is not covered by said plurality of operation buttons, and said indication position moving means can move the position of the image to said indirect image display area.

7. The multi-function switch unit as set forth in claim 5, wherein said different directions includes upward, downward, left, and right directions.

* * * * *